2,944,967

METHODS FOR TREATING LIQUID CIRCULATING SYSTEMS AND COMPOSITIONS THEREFOR

Edward W. Dunklin, Port Arthur, Ontario, Canada, and Marie K. Moudry, Northfield, Ill., assignors to United States Movidyn Corporation, Chicago, Ill., a corporation of Illinois No Drawing. Filed May 12, 1958, Ser. No. 734,450

10 Claims. (Cl. 210—64)

This invention relates to the treatment of liquid circulating systems and to compositions therefor. While of broader utility, the invention is particularly advantageous in the treatment of paper mill recirculating waters to control slime formation therein.

Liquid circulating systems, and particularly paper mill recirculating systems, are commonly subject to the formation of troublesome slimes. In paper mills, slimes are a particularly objectionable factor because of the tendency for the slime to be introduced into the paper, making the product unsalable. Slimes occurring in such systems have heretofore been considered to result from the action of slime-forming micro-organisms and have universally been treated by means of microbicides. In paper mill systems, for example, it is common practice to add to the system, as a slime inhibitor, an agent, such as phenyl mercuric acetate, capable of destroying slime-forming organisms.

In many cases, however, such agents as phenyl mercuric acetate have proved incapable of controlling slime formations. This has been found to be particularly true in the case of paper mill recirculating systems. Unfortunately, when such systems are in commercial operation, their varied nature makes it difficult to conduct tests capable of disclosing the reasons for slime formation. Accordingly, operators faced with the problem have only been able to try the various preparations on the market, without any detailed knowledge of the trouble being combated by use of the preparation. Since the systems are periodically shut down, thoroughly cleaned, and then put back into operation with a different slime inhibitor, there is frequently an illusory appearance of success because of the benefit from thorough cleaning during down time. Then, the slimes subsequently return, showing that the new inhibitor was actually no more effective than the one tried before.

We have discovered that, in many such instances, the primary difficulty is that the slimes are either not entirely, or not at all, the result of action of micro-organisms. We have found that, when microbicides such as phenyl mercuric acetate are ineffective, the slimes involved arise at least in part from the formation of chemical precipitates, namely, the insoluble hydroxides of the polyvalent amphoteric metals, particularly iron, aluminum, titanium, zinc, tin and manganese. In circulating systems wherein slimes still survive treatment with phenyl mercuric acetate or the like, we have observed that the liquid being circulated flows first through a portion of lower pH and then through a portion of higher pH. With the polyvalent metal ions in solution prior to arrival of the liquid at the area of higher pH, precipitation of the hydroxides occurs at the latter area, forming deposits which are intitially amorphous, gelatinous and slimy, so as to be easily mistaken for bacteria-formed slime. On drying, such deposits become scaly and encrusted and are frequently loosened to flow with the circulating liquid. Once formed, such "chemical slimes" actually promote formation of slimes by bacterial activity. The chemical deposits trap organic material, such as pulp fibers, etc., in the case of a paper mill, and provide an ideal environment for bacterial multiplication. Further, the chemically formed deposits usually contain iron in a form suitable for feeding sulfate bacteria. A system of the type referred to, subject to formation of chemical slimes, may remain trouble-free for long periods. Then, a relatively small amount of chemical slime deposits in one favorable portion of the system. Once such small deposit is established, the slimes build up progressively and rapidly and cannot be brought under control with microbicides, so that the system must be shut down for cleaning.

The polyvalent metal ions referred to are usually introduced into the system with the water or other liquid being circulated. Further, and this is particularly true in paper mill white water systems, such ions are introduced in additive materials.

With the problem thus identified, it would appear that chemically-formed slimes could be controlled by use of a sequestering agent in the circulating liquid. We have found, however, that the more conventional and readily obtainable sequestering agents, such as ethylene diamine tetra acetic acid or its appropriate salts, or the polyphosphates, for example, are not effective. Whether this is due to the factor of relative sequestering ability, or the mode of sequestration, or the nature of the situs in which the sequestering agent finds itself, we have not been able to determine.

Broadly, the invention is based on the discovery that slime formations in such circulating systems can be successfully combated by means of certain special sequestering agents, either used alone, when the slimes are substantially wholly the result of chemical action, or in conjunction with a microbicide, when both chemical and bacterial action are involved. The special agents of the invention are those selected from the group consisting of the sugar acids, the alkali metal, alkaline earth metal and ammonium salts of the sugar acids, and sorbitol. When one of said compounds, or a mixture of two or more thereof, is incorporated in a liquid circulating system of the type referred to, with the addition being made at a point of lower pH, the compound or compounds are effective in such system to sequester the polyvalent metal ions to such an extent as to either preclude or satisfactorily minimize the formation of chemical slimes, depending upon the amount of the additive compounds employed. While the entire class of compounds just mentioned is operable in accordance with the invention, we have found that the glucoheptonates are particularly effective. Thus, particularly good results are obtained by employing sodium glucoheptonate. Other typical sugar acid compounds useful in accordance with the invention are gluconic acid, sodium gluconate, saccharic acid and potassium sodium saccharate.

The special sequestering agents can be employed in dry form, being added directly to the circulating water to dissolve therein, or in the form of aqueous solutions. In both cases, other agents can be combined therewith.

The invention embraces the conjoint use of both (1) at least one of the special sequestering agents and (2) at least one microbicide. Microbicides useful in accordance with the invention include phenyl mercuric acetate, the oligodynamic metals, quaternary ammonium compounds, phenols, chlorinated phenols, chlorine and active chlorine compounds, including sodium hypochlorite, calcium hypochlorite, chloramine and chlorine dioxide. A particularly advantageous embodiment of the invention embraces a novel multi-effect slime inhibiting composition containing at least one of the sequestering agents and, as a compatible microbicide, either phenyl mercuric acetate, at least one oligodynamic metal, or both phenyl mercuric acetate and at least one oligodynamic metal.

In order that the special sequestering agents above referred to shall be effective in controlling chemical slimes, the same must be added to the circulating water in an amount sufficient to provide a concentration thereof, at the point or points in the system subject to formation of chemical slimes, of 0.1–100 parts per million. When both a special sequestering agent and a microbicide are employed in accordance with the invention, the materials must be added to the system in proportion to provide a concentration of the microbicide of from a fraction of a part per million to 10 parts per million and a concentration of the sequestering agent of 0.1–100 parts per million.

In considering recirculating systems, it must be recognized that in many such systems a substantial amount of the liquid may be withdrawn, either continuously or intermittently, so that all of the liquid is not actually recirculated. Thus, in paper mill systems, for example, the amount of liquid lost from the system usually is on the order of 20% or more. Accordingly, it is common practice to introduce fresh make-up liquid in amounts corresponding to the liquid lost or purposely withdrawn. In such instances, the additives of the present invention are added, either continuously or intermittently, at rates calculated to first build up the desired concentration of the sequestering agent and then maintain such concentration in view of the liquid withdrawn or lost. Thus, we may at first add the agent at a relatively high rate, say 50 parts per million per hour, until the desired concentration of sequestering agent has been built up, the rate then being reduced to a lower level, say 20 parts per million per hour, calculated to just replace the amount of sequestering agent carried off by the liquid which is not recirculated. Alternatively, an amount of sequestering agent sufficient to provide the desired concentration can be incorporated as a single addition in a portion of the system which is not circulating, and supplementary additions made thereafter, either continuously or intermittently, to compensate for the reduced concentration of sequestering agent resulting from lost or withdrawn liquid.

In many recirculating systems, and particularly paper mill systems, the amount of liquid in the system varies from point to point. Accordingly, it is necessary to consider the concentration of the additives of the invention at those particular points where the problem of chemical slime is most likely to arise. In other words, while the additive may be introduced to the system at any of a number of points along the path of the recirculating liquid, the rate of addition of the additive must be calculated with relation to the concentration desired at a given point, usually considerably removed from the point of addition.

Our observations, both in actual practice and in laboratory investigations, indicate that, when both a microbicide and a special sequestering agent are employed, the special sequestering agents of this invention in some way improve the effectiveness of the microbicides. This can be explained in part by the fact that chemical deposits caused by presence of polyvalent metal ions in the circulating liquid apparently tend to protect the slime-forming organisms from the bactericide. Also, the presence of certain metals actually supports bacteria, as in the case of iron supporting the sulfate bacteria. Further, it seems probable that the polyvalent metal ions have a disadvantageous chemical effect upon the microbicides.

The problems involved in paper mill circulating systems require special attention in employing the invention, and it is accordingly necessary to refer to such systems in some detail. In the making of paper, the fiber stock and various additives, particularly including starch, size, loading material such as clay, and a rather large amount of alum are all introduced at a given portion of the system, usually in the beater, mixing tank, or equivalent, hereinafter referred to as the "beater." The resulting suspension is carried forward through the various parts of the apparatus, including refiners, storage chests, consistency regulators, and the like, to that point at which the stock suspension is applied to the paper former, such as the Fourdrinier wire. At this point, the predominant portion of the fiber stock is of course formed into paper, while the liquid flows on to a collection point, usually referred to as the wire pit, from which the water is ultimately recirculated either to the point of stock addition, such as the beater, or to another portion of the system where the stock requires dilution. The system is usually quite complex and the recirculation is accomplished through varied paths, one or more of which may include a clarification step. Thus, the water being recirculated may be in part unclarified white water and in part clarified water by itself or in combination with raw water. Usually, recirculation is carried out to various points between the beater and the paper former.

The pH of the liquid being circulated varies rather widely from point to point. Thus, the pH of the liquid leaving the wire pit may be relatively low. On the other hand, because of the additives involved, the pH may rise considerably in the beater and then is further changed as the liquid flows toward the paper former, because of the various steps, including particularly dilution, carried out between the beater and the paper former.

A particularly important consideration, in practicing the present method with respect to paper mills, is the fact that the metal ions introduced into the beater by addition of the alum are readily sequestered by the special agents employed. Sequestration of these particular ions in the beater and immediately thereafter is undesirable for two reasons, the first being the fact that this would decrease the effectiveness of the sequestering agent in later portions of the system, and the second being that the alum should be free to act in the stock suspension until such time as the size has been fully set. Accordingly, in many instances, it is particularly advantageous to introduce the sequestering agent into the system of the paper mill at a point between the beater and the paper former, so that the alum has had an opportunity to set the size before coming into contact with freshly incorporated sequestering agent. Thus, the sequestering agent can be introduced between the beater and the refiner or between the refiner and the consistency regulator, for example.

In those cases where slime problems are encountered between the paper former and the input side of the beater, it is possible to add the sequestering agent in the wire pit.

When employing both the sequestering agent and bactericide, by introducing these agents separately, the bactericide can be added directly in the beater or at a suitable point between the beater and the paper former, as just prior to the head box. When using the novel multi-effect compositions of the invention, such compositions are advantageously added between the beater and the head box.

In addition to keeping the paper mill free of slimes, the invention is particularly effective in inhibiting or minimizing what is known as color reversion in the paper product made by the mill and therefore in improving the brightness of the paper, when using a bleached pulp to make white or light-colored paper. Color reversion results from the presence of a material proportion of iron, in ionic form, which is carried into the paper and subsequently oxidized to ferric oxide by contact of the paper with air. A similar problem arises from the presence of manganese. When proceeding in accordance with the invention, the special sequestering agents effectively remove the iron and manganese so that the finished product is not subject to color reversion.

The following examples are typical:

Example 1

The process was carried out in a conventional paper mill where severe slime problems had been encountered. Operators of this particular mill had not been able to maintain the mill in continuous production for longer than about 7 days without shutting down for slime removal. The slimes encountered had been considered to be of organic origin but did not respond to treatment with conventional agents such as phenyl mercuric acetate. Application of the present invention was in accordance with the following procedure:

Employing a mixture of a-sodium glucoheptonate and b-sodium glucoheptonate as the sequestering additive, the same is introduced to the white water system in the wire pit and in a pulp storage chest downstream from the wire pit. At both points, the pH of the white water may be relatively low, on the order of 3.0–7.0. Downstream in the system, the pH is usually increased in order to modify the nature of the paper, avoid corrosion of the equipment and, in some cases, merely as a result of chemical additives. The glucoheptonate is added at an initial rate sufficient to build up a concentration of the sequestering agent, at the forming wire, in excess of 0.5 part per million. Addition is then maintained at a reduced rate to keep the concentration in the range of 0.3–2.0 parts per million.

With the special sequestering agent added in this manner, the paper mill was kept in continuous operation for over 2 months without encountering objectionable slime.

Example 2

The procedure of Example 1 is repeated, using sorbitol as the sequestering agent and adding the same between the beater and the refiners and between the refiners and the consistency regulator at a rate to maintain a concentration of sorbitol at the forming wire on the order of 25 parts per million. Under conditions where the mill cannot be maintained slime-free with phenyl mercuric acetate, slime control is accomplished for prolonged periods.

It will be noted from this example that the sorbitol, being less effective than the glucoheptonate, is added in a greater proportion.

Example 3

The method of Example 1 has proved particularly effective in those situations where an alkaline material is introduced to the pulp suspension as the latter is applied to the paper former. A usual situation is one where polyphosphates are added in water introduced as a shower, between the head box and the paper former, to control pitch from the wood pulp. Addition of the polyphosphates causes a marked increase in pH which often leads to formation of chemical slimes. In accordance with the present invention, the special sequestering agent is particularly effective to prevent precipitation of polyvalent metal hydroxides which would normally occur in this type of paper mill operation.

Example 4

In a conventional paper mill which, in operation, exhibited extensive slime formation which could be reduced, but not adequately controlled, with phenyl mercuric acetate, the process of the invention was followed by incorporating a mixture of a-sodium glucoheptonate and b-sodium glucoheptonate in the system between the refiners and the consistency regulator, while concurrently adding phenyl mercuric acetate just upstream of the head box. Additions were made at such a rate that the concentration of the glucoheptonate was maintained, at the forming wire, in the range of 0.3–2 parts per million, while the concentration of the phenyl mercuric acetate at the same point was maintained above 0.1 part per million.

With this simultaneous use of the special sequestering agent and phenyl mercuric acetate, successful control of the slime was accomplished.

Example 5

The procedure of Example 4 was repeated, using, in place of phenyl mercuric acetate, an aqueous colloidal suspension of oligodynamic silver microparticles prepared in accordance with co-pending application Serial No. 343,705, filed March 20, 1953, now Patent No. 2,927,052, by Zdenek V. and Marie K. Moudry. The suspension can, for example, contain 3% by weight silver and is added at a rate to maintain the concentration of silver, at the forming wire, of several hundredths of a part per million if the slime problem is of average severity. The mill is again maintained slime-free for prolonged periods where satisfactory results are not possible with oligodynamic silver alone.

Example 6

A multi-effect slime inhibiting composition is prepared by first preparing, in acccordance with the procedure of the aforementioned Patent No. 2,927,052, a colloidal suspension of oligodynamic silver and copper microparticles, predominantly smaller than 700 A.U., in water, and then intimately mixing with the suspension an aqueous solution of a-sodium glucoheptonate and b-sodium glucoheptonate. In making the oligodynamic metal suspension, a sufficient quantity of silver and copper salts is employed to yield, after reduction in the presence of gelatin, an amount of silver and copper microparticles equal to 3% by weight of the aqueous suspension. Employing a 35% solution of the glucoheptonate, enough solution is added to provide an amount of the sequestering agent equal to about 100 times the weight of the oligodynamic metals.

The resulting liquid composition is employed to treat a paper mill recirculating system subject to formation of both organic and chemical slimes, the composition being metered into the system at a point between the consistency regulator and the head box, and the rates of addition being such that the total concentration of oligodynamic silver and copper at the paper former, is kept in the range of several hundredths of a part per million. The concentration of the sequestering agent at the head box is accordingly maintained at several parts per million.

With such treatment, the paper mill is kept substantially slime-free for prolonged periods.

Example 7

A multi-effect slime inhibiting composition containing both phenyl mercuric acetate, as a bactericide, and a special sequestering agent to control chemical slimes and thus decrease the tendency for slime forming bacteria to multiply, is prepared as follows: Sufficient phenyl mercuric acetate to provide a 30% solution is mixed with water and ammonium hydroxide and ammonium sulfate then added to bring the pH to approximately 8. The suspension is stirred until the phenyl mercuric acetate is completely dissolved. An amount of mixed a-sodium glucoheptonate and b-sodium glucoheptonate, either as solid or in aqueous solution, equal to approximately 10 times the weight of phenyl mercuric acetate is now dissolved in the solution. The solution is then diluted with water to make the concentration of phenyl mercuric acetate 3%, that of the glucoheptonate then being 30% by weight.

This composition is employed to treat the recirculating water system of the paper mill in the same manner as in Example 5, the rate of addition being such as to maintain the concentration of phenyl mercuric acetate at 0.1–0.2 part per million and that of the sequestering agent at 1–2 parts per million.

Alternatively, a multi-effect composition containing the special sequestering agent and, as bactericides, both oligodynamic silver and phenyl mercuric acetate, can be prepared by incorporating the sequestering agent in compositions prepared in accordance with co-pending application Serial No. 532,306, filed September 2, 1955, now Patent No. 2,853,449, by Zdenek V. and Marie K. Moudry.

For the treatment of many types of circulating systems, and particularly for the treatment of many conventional paper mills, the novel multi-effect compositions of the invention, such as those described in Examples 5 and 6, are particularly advantageous because they simplify the handling of the slime control chemicals by the operator. While, as a general proposition, these novel compositions embrace the use of any effective microbicide which is compatible with the special sequestering agent employed, particular advantages are attained by using as the microbicide an aqueous suspension of oligodynamic microparticles.

In considering the novel multi-effect compositions of the invention, the same may contain 1.0–200 parts by weight of the microbicide, and 10–10,000 parts by weight of the special sequestering agent. The particular proportional relationship employed depends, for the most part, on the type of slime problem against which the composition is to be used, and upon the effectiveness of the particular sequestering agent and microbicide employed. If the slime is predominantly the result of micro-organisms, but is worsened by a slight tendency toward the formation of chemical slimes, a composition employing a proportion of sequestering agent in the lower portion of the range just mentioned will ordinarily be entirely satisfactory. On the other hand, if the slime arises primarily because of the precipitation of the hydroxides of the polyvalent metals mentioned, with bacteria being only a secondary problem, adequate control can be obtained with a composition employing an increased proportion of the sequestering agent.

It is ordinarily desirable to minimize the amount of bactericide employed, both for reasons of economy and because of the potency of such materials as phenyl mercuric acetate. Thus, in actual practice, the concentration of the microbicide in the circulating water being treated can be as low as 0.01 part per million. A greater lattitude is afforded with respect to the sequestering agent. While the concentration of this material can be as low as 0.1 part per million in the circulating liquid, many times more sequestering agent than microbicide can be used.

While the invention has particular utility in treating the circulating waters of paper mills, it is also applicable in numerous other fields.

We claim:

1. The method for controlling slimes in a circulating liquid system wherein the liquid contains polyvalent metal ions and is successively at a lower pH and then a higher pH during circulation, comprising introducing into the circulating liquid at least one sequestering agent selected from the group consisting of the sugar acids, the alkali metal, alkaline earth metal and ammonium salts of the sugar acids, and sorbitol, and circulating the liquid through the system, said addition being made at a rate to provide a concentration of the sequestering agent, at the point or points of the system subject to slime formation, equal to 0.1–100 parts per million, said sequestering agents being effective to sequester such polyvalent metal ions and thereby prevent precipitation of slime-forming chemical compounds when the circulating liquid is at the higher pH.

2. The method for controlling slimes in the liquid circulating system of a paper mill, which system includes portions at which the circulating water is at a lower pH and other portions at which the circulating water is at a higher pH, said water containing ions of at least one polyvalent metal selected from the group consisting of iron, aluminum, titanium, zinc, tin and manganese, comprising introducing into the circulating system at least one sequestering agent selected from the group consisting of the sugar acids, the alkali metal, alkaline earth metal and ammonium salts of the sugar acids, and sorbitol, and circulating the liquid to carry such sequestering agent to said portions of higher pH, said introduction being at a rate to provide a concentration of the sequestering agent, at the paper former of the mill, of 0.1–100 parts per million, said sequestering agents being effective to sequester said polyvalent metal ions and thereby prevent precipitation of the slime-forming hydroxides thereof when the circulating water is at the higher pH.

3. In the operation of a paper mill of the type comprising a recirculating water system having a first point in which the system contains pulp and non-pulp components including size and alum and a second point at which the pulp suspension is applied to a paper former, the method for combating slime formation in the system without deleteriously affecting the action of the alum in setting the size comprising incorporating in the recirculating water at least one slime-inhibiting compound of the class consisting of the sugar acids, the alkali metal, alkaline earth metal and ammonium salts of the sugar acids, and sorbitol; said incorporation being made at at least one point in the system located between said first and second points and at a rate sufficient to provide a concentration of such slime-inhibiting compound at said second point of 0.1–100 parts per million.

4. The method for combating slime formation in paper mill circulating waters containing ions of at least one polyvalent metal selected from the group consisting of iron, aluminum, titanium, zinc, tin and manganese and having a first portion in which the circulating water is at a lower pH and a second portion at which the circulating water is at a higher pH, comprising adding to the circulating water at said first portion a slime-inhibiting composition comprising at least one microbicide and at least one sequestering agent selected from the group consisting of the sugar acids, the alkali metal, alkaline earth metal and ammonium salts of the sugar acids, and sorbitol, the proportion of sequestering agent in said composition being in the range of from 1/20 to 50 times the weight of the microbicide, and said addition being at a rate providing a concentration of the sequestering agent, at the paper former of the mill, of at least 0.1 part per million.

5. The method of claim 4 wherein said bactericide comprises oligodynamic silver.

6. The method of claim 4 wherein said bactericide comprises phenylmercuric acetate.

7. A method for controlling chemical slimes in a paper mill circulating water, which water contains ions of at least one polyvalent metal of the group consisting of iron, aluminum, titanium, zinc, tin and manganese, flows in contact with a paper former at a point where an alkaline chemical is added thereto in such fashion as to significantly increase the pH of the water, and exhibits a significantly lower pH at another point in its flow, said method comprising incorporating in said water at least one sequestering agent selected from the group consisting of the sugar acids, the alkali metal, alkaline earth metal and ammonium salts of the sugar acids, and sorbitol, said incorporation being made at said point of lower pH and at a rate sufficient to maintain a concentration of the sequestering agent, at the paper former, of at least 0.1 part per million.

8. A slime-inhibiting composition for addition to circulating liquids comprising an aqueous medium, at least one sequestering agent selected from the group consisting of the sugar acids, the alkali metal, alkaline earth metal and ammonium salts of the sugar acids, and sorbitol, dissolved in said medium, and at least one bactericide distributed in said medium and effective to destroy slime-forming micro-organisms, the proportion of sequestering agent being from 1/20 to 50 times the weight of bactericide.

9. The composition of claim 8 wherein said microbicide comprises microparticles of oligodynamic silver colloidally suspended in said medium.

10. The composition of claim 8 wherein said microbicide comprises phenl mercuric acetate dissolved in said medium.

References Cited in the file of this patent

UNITED STATES PATENTS

| | | |
|---|---|---|
| 2,221,339 | Allison | Nov. 12, 1940 |
| 2,692,231 | Stayner | Oct. 19, 1954 |

OTHER REFERENCES

Martell and Calvin: Chemistry of the Metal Chelate Compounds, pp. 499 and 511; pub. by Prentice-Hall, New York, N.Y., 1952.

Casey: Pulp and Paper Volt; pub. by Interscience Publishers, New York, N.Y., 1952, pp. 693, 694.